US005450104A

United States Patent [19]

[11] Patent Number: 5,450,104
[45] Date of Patent: Sep. 12, 1995

Kisa et al.

[54] INK JET RECORDING APPARATUS

[75] Inventors: Kazuyuki Kisa; Nobuyuki Koito, both of Kanagawa, Japan

[73] Assignee: Fuji Electric Co., Ltd., Kanagawa, Japan

[21] Appl. No.: 943,830

[22] Filed: Sep. 14, 1992

[30] Foreign Application Priority Data

Mar. 6, 1992 [JP] Japan .................................. 4-048944

[51] Int. Cl.$^6$ ............................ B41J 2/01; G01D 9/00

[52] U.S. Cl. ........................................... 347/2; 346/62; 346/78

[58] Field of Search ...................... 346/1.1, 75, 140 R, 346/23, 34, 62, 139 R, 78, 33 R, 33 D, 33 TP; 347/2, 3, 15, 5, 14

[56] References Cited

U.S. PATENT DOCUMENTS

| | | | |
|---|---|---|---|
| 4,040,063 | 8/1977 | Berglund | 346/23 |
| 4,050,075 | 9/1977 | Hertz et al. | 346/75 |
| 4,106,029 | 8/1978 | Albarda et al. | 346/139 R X |

FOREIGN PATENT DOCUMENTS

| | | |
|---|---|---|
| 2508695A1 | 9/1976 | Germany . |
| 2620318A1 | 11/1976 | Germany . |
| 2633978B1 | 8/1977 | Germany . |
| 2902475B1 | 4/1980 | Germany . |
| 3007844A1 | 9/1980 | Germany . |
| 3342727A1 | 5/1984 | Germany . |
| 3607249C2 | 5/1987 | Germany . |
| 4107636A1 | 3/1991 | Germany . |
| 1301292 | 12/1972 | United Kingdom . |

OTHER PUBLICATIONS

Von Karl-Erik Berntson, "Neue Entwicklungen in der Rasterdrucktechnik" Feinwerktechnik & Messtechnik 90(1982)3.

IBM Technical Disclosure Bulletin, "Computer Graphics Anti-Aliasing by Ideal Line Pixel Coverage," vol. 36, No. 4, Apr. 1993.

*Primary Examiner*—Joseph W. Hartary
*Assistant Examiner*—Alrick Bobb
*Attorney, Agent, or Firm*—Finnegan, Henderson, Farabow, Garrett & Dunner

[57] ABSTRACT

An ink jet recording apparatus that makes a recording of a measured input at a time occurring at a predetermined cycle and includes a control section for making the recording at the time by printing dots in the form of a segment in a recording sheet width direction. The segment corresponds to a variation of a measured input between a time and a time before such time. For example, the apparatus prints a segment connecting a position corresponding to a measured input value at a certain time to a position corresponding to a measured input at a time before such certain time, or the apparatus prints a segment connecting positions respectively corresponding to a minimum measured input value and a maximum measured input value between a certain time and a time before such certain time. Accordingly, the apparatus produces a printed line apparently close to a line obtained by a continuous recording system, although the recording is intermittent and thus takes place at a predetermined cycle. An advantage is that a conspicuous fluctuation in flow rate can be reproduced as faithful to the actual situation as possible.

8 Claims, 7 Drawing Sheets

| MEASUREMENT POINT NUMBER | INSTANTANEOUS VALUE | | MAXIMUM VALUE | MINIMUM VALUE |
|---|---|---|---|---|
| | CURRENT VALUE | LAST VALUE | | |
| 1 | | | | |
| 2 | | | | |
| 3 | | | | |
| | | | | |

INK JET RECORDING APPARATUS

BACKGROUND OF THE INVENTION

1. Field of the Invention

The invention relates to an ink jet recording apparatus which can provide recording close to apparently continuous recording although a recording system that is characterized by printing dots intermittently at a predetermined cycle is adopted.

2. Related Art

A conventional ink jet recording apparatus is based on a recording system characterized by printing dots intermittently at a predetermined cycle. FIG. 12 shows an essential part of an exemplary variation of actually measured values. In FIG. 12, the X-axis extends horizontally along the recording width for measurement, whereas the axis of the T extends vertically. If the quantity to be measured is flow rate, a line R expressing a variation of measured values is noticeably erratic as shown in FIG. 12. The explanation will go on hereinbelow assuming that coordinates corresponding to the measured values at times T1, T2, T3, T4 are X1, X2, X3, X4, respectively and, further, that the minimum and the maximum between times T1 and T2, between times T2 and T3, and between times T3 and T4 are X2, X2u, X3v, X3u, X3v, and X4, respectively.

The variation of FIG. 12 becomes as shown in FIG. 11 when printed in the form of dots every 30 seconds by the conventional ink jet recording apparatus. That is, in FIG. 11, dots are printed discontinuously at positions corresponding to coordinates X1, X2, X3, and X4 corresponding to the measured values at times T1, T2, T3, and T4, respectively. In FIG. 11, the recording sheet forward speed is 50 mm/hour (about 0.4 mm/30 seconds), and the line is recorded with the diameter of each dot being 0.4 mm.

The conventionally printed line shown in FIG. 11 becomes relatively calm even if the quantity to be measured is subject to conspicuous fluctuations such as flow rate, because the dots are printed discontinuously. Therefore, such printed line may be misjudged as being something different from what it is. To express the actual variation correctly, there is no other technique more suitable than making an almost continuous recording based on a known pen-recording system. It is for this reason that there has been a strong demand for an art that allows recording close to pen-recorded continuous recording to be achieved using a conventional ink jet recording apparatus.

SUMMARY OF THE INVENTION

The present invention has been made in view of the above-mentioned problems addressed by the conventional art. Accordingly, the object of the invention is to provide an ink jet recording apparatus capable of producing apparently continuously recorded lines even if a recording system characterized by printing dots intermittently at a predetermined cycle is adopted.

To achieve the above object, a first aspect of the invention is applied to an ink jet recording apparatus that makes a recording of a measured input at a time occurring at a predetermined cycle and includes a control section for making the recording at the time by printing dots in the form of a segment in a recording sheet width direction. The segment corresponds to a variation of a measured input between a time and a time before such time.

A second aspect of the invention is applied to the above-mentioned ink jet recording apparatus, in which such recording at a time is a printing of a segment connecting a position corresponding to a measured input value at such time to a position corresponding to a measured input value at a time before such time.

A third aspect of the invention is applied to the above-mentioned ink jet recording apparatus in which such recording at a time is a printing of a segment connecting positions respectively corresponding to a maximum measured input value and a minimum measured input value between such time and a time before such time.

A fourth aspect of the invention is applied to the above-mentioned ink jet recording apparatus, in which a recording at every other time on one side is a printing of a segment connecting a position corresponding to a measured input value at such every other time on one side to a position corresponding to a measured input value at a time before such every other time on one side, and in which a recording at every other time on the other side is a printing of a dot at a position corresponding to a measured input value at such every other time on the other side.

A fifth aspect of the invention is applied to the above-mentioned ink jet recording apparatus, in which a recording at every other time on one side is a printing of a segment connecting positions respectively corresponding to a maximum measured input value and a minimum measured input value between such every other time on one side and a time before such every other time on one side, and in which a recording at every other time on the other side is a printing of a dot at a position corresponding to a measured input value at such every other time on the other side.

The ink jet recording apparatus according to one of the first to fifth aspects of the invention is designed to cause the control section to make a recording at a time by printing a dot or dots in the form of a segment extending in a recording sheet width direction in such a manner that the segment corresponds to a variation of a measured input between such time and a time before such time.

The ink jet recording apparatus according to the second aspect of the invention, in particular, makes a recording at a time by printing dots in the form of a segment connecting a position corresponding to a measured input value at such time to a position corresponding to a measured input value at a time before such time.

The ink jet recording apparatus according to the third aspect of the invention, in particular, makes a recording at a time by printing dots in the form of a segment connecting positions respectively corresponding to a maximum measured input value and a minimum measured input value between such time and a time before such time.

The ink jet recording apparatus according to the fourth aspect of the invention, in particular, makes not only a recording at every other time on one side by printing dots in the form of a segment connecting a position corresponding to a measured input value at such every other time on one side to a position corresponding to a measured input value at a time before such every other time on one side, but also a recording at every other time on the other side by printing a dot at a position corresponding to a measured input value at such every other time on the other side.

The ink jet recording apparatus according to the fifth aspect of the invention, in particular, makes not only a recording at every other time on one side by printing dots in the form of a segment connecting positions respectively corresponding to a maximum measured input value and a minimum measured input value between such every other time on one side and a time before such every other time on one side, but also a recording at every other time on the other side by printing a dot at a position corresponding to a measured input value at such every other time on the other side.

DETAILED DESCRIPTION OF THE PREFERRED EMBODIMENTS

Ink jet recording apparatuses, which are embodiments of the invention, will now be described with reference to the accompanying drawings.

Figure 1:
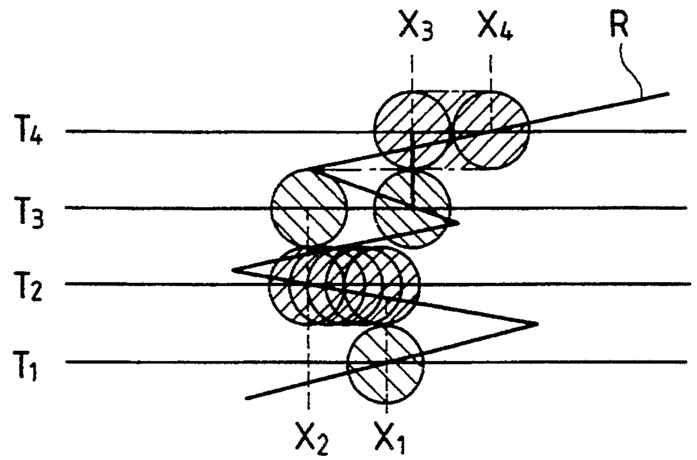
FIG. 1 is a diagram showing a main portion of an exemplary printed line in a first embodiment of the invention.
Figures 4, 5:
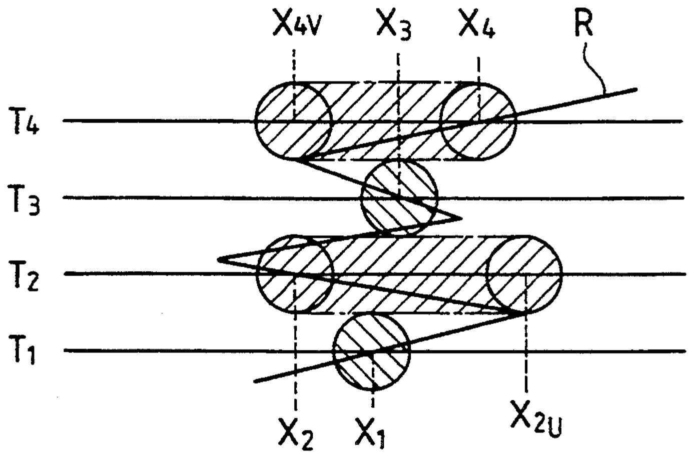
FIG. 4 is a diagram showing a main portion of an exemplary printed line in a fourth embodiment.
FIG. 5 is a diagram showing an arrangement of a measurement memory.

FIG. 1 is a diagram showing a main portion of an exemplary printed line in a first embodiment, which corresponds to the second aspect of the invention. In FIG. 1, recording at respective times is printing of a segment connecting the position corresponding to a measured input value at a time to the position corresponding to a measured input value at a time before such time. More specifically, assuming that a measured value at a time T1 is X1, recording at a next time T2 becomes a segment indicated by hatching, the segment connecting a measured value X2 at time T2 to measured value X1 at time T1, which is one time before time T2. Similarly, recording at a time T3 becomes a segment connecting a measured value X3 at time T3 to measured value X2 at time T2, which is one time before time T3. Recording at a time T4, which is a next time, becomes a segment connecting a measured value X4 at time T4 to measured value X3 at time T3, which is one time before time T4. It is assumed that the cycle of a time, the recording sheet forward speed, and the diameter of a dot to be printed are the same as shown in FIG. 5. In the first embodiment it is understood that a recording quite faithful to a line R corresponding to an actual variation of the measured values can be obtained.

Figure 2:
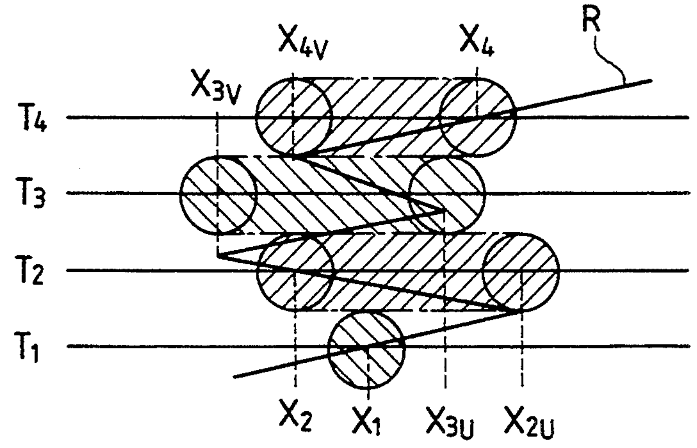
FIG. 2 is a diagram showing a main portion of an exemplary printed line in a second embodiment.

FIG. 2 is a diagram showing a main portion of an exemplary printed line in a second embodiment, which corresponds to the third aspect of the invention. In FIG. 2, recording at respective times is a segment connecting the position corresponding to the maximum measured input value between a time and a time before such time to the position corresponding to the minimum measured input value between such times. More specifically, assuming that a measured value at time T1 is X1, recording at a next time T2 becomes a segment connecting a minimum value X2 to a maximum value X2u between times T1 and T2. Similarly, recording at time T3 becomes a segment connecting a minimum X3v to a maximum X3u between times T2 and T3. Recording at a next time T4 becomes a segment connecting a minimum value X4v to a maximum value X4 between times 3 and 4. It is understood that a recording obtained in the second embodiment is more faithful to the line R corresponding to the actual variation of the measured values than in the first embodiment.

Figure 3:
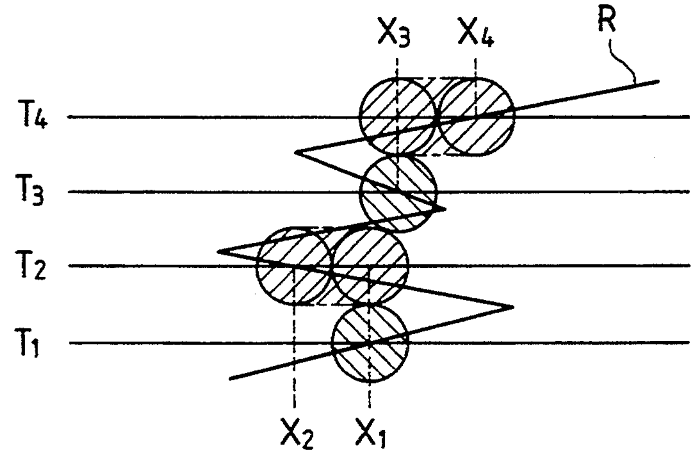
FIG. 3 is a diagram showing a main portion of an exemplary printed line in a third embodiment of the invention.

FIG. 3 is a diagram showing a main portion of an exemplary printed line in a third embodiment, which corresponds to the fourth aspect of the invention. In FIG. 3, a recording at every other time on one side becomes a segment connecting the position corresponding to a measured input value at a time to the position corresponding to a measured input value at a time before such time, whereas recording at every other time on the other side becomes a dot at the position corresponding to a measured input value at such every other time. More specifically, assuming that a measured value at time T1 is X1, recording at a next time T2 becomes a segment connecting measured value X2 at time T2 to measured value X1 at time T1, which is one time before time T2. However, recording at a next time T3 becomes only a single dot at measured value X3 at time T3 similar to the recording at time T1. Recording at a next time T4 becomes a segment connecting measured value X4 at time T4 to measured value X3 at time T3, which is one time before time T4. In this way, recording is made with a dot corresponding to a measured values at each odd time or with a segment similar to the segment in the first embodiment at each even time. Thus, the dot alternates with the segment. In the third embodiment, basically similar to the first embodiment, recording is quite faithful to the line R corresponding to the actual variation of the measured values. In addition, with a dot inserted at every other time, a recording agreeable to look at, in which the fluctuation is somewhat suppressed or simplified, can be obtained.

FIG. 4 is a diagram showing a main portion of an exemplary printed line in a fourth embodiment, which corresponds to the fifth aspect of the invention. In FIG. 4, recording at every other time on one side becomes a segment connecting the position corresponding to the maximum measured input value between a time and a time before such time to the position corresponding to the minimum measured input value between such times, whereas recording at every other time on the other side becomes a dot at the position corresponding to a measured input at such every other time. More specifically, assuming that a measured value at time T1 is X1, recording at a next time T2 becomes a segment connecting minimum value X2 to maximum value X2u between times T1 and T2. However, recording at a next time T3 becomes only a single dot at measured value X3 at time T3 similar to the recording at time T1. Recording at a next time T4 becomes a segment connecting minimum value X4v and maximum value X4 between times T3 and T4 similar to the recording at time T2. In this way, recording is made with a dot corresponding to a measured value at each odd time or with a segment similar to the segment in the second embodiment at each even time. Thus, the dot alternates with the segment. In the fourth embodiment, basically similar to the second embodiment, recording is quite faithful to the line R corresponding to the actual variation of the measured values. In addition, with a dot inserted at every other time, a recording agreeable to look at, in which the fluctuation is somewhat suppressed or simplified, can be obtained.

Figure 6:
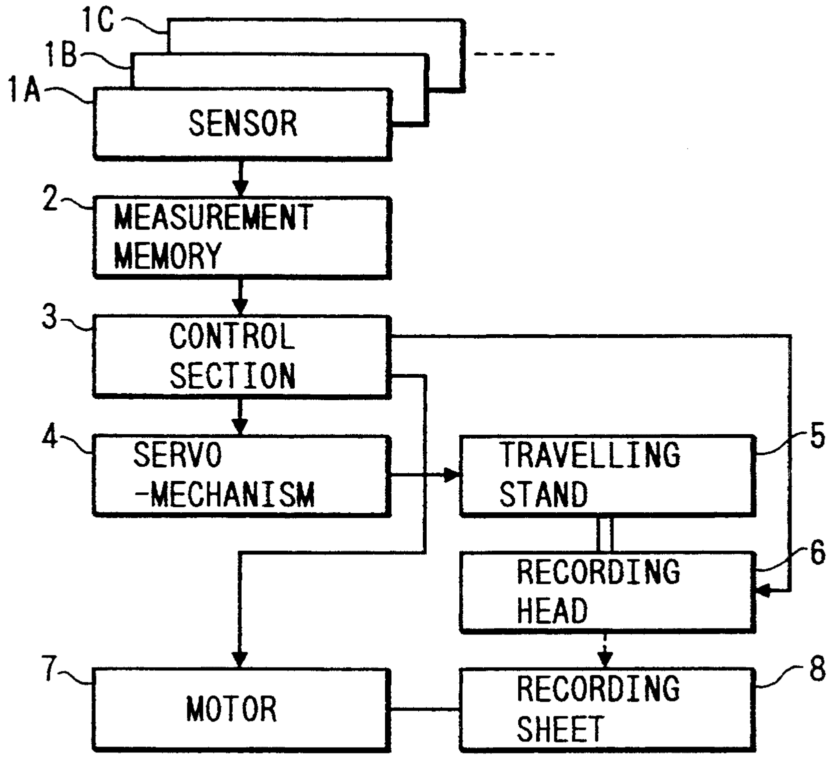
FIG. 6 is a block diagram showing a configuration common to the respective embodiments and a conventional example.

FIG. 6 is a block diagram showing a configuration common to the embodiments. This figure is also common to the block diagram showing the configuration of the conventional example. In FIG. 6, data measured at respective times by sensors 1A, 1B, 1C corresponding to a plurality of measuring channels and other data are stored in a measurement memory 2. The latest channel-based measured data and the like at each time are read every 30 seconds and applied to a control section 3. The control section 3 not only drives a servo-mechanism 4 in accordance with each measured data to position a travelling stand carrying a recording head 6 thereon, but also causes the recording head to jet an ink of a color corresponding to each measuring channel, or print dots, at such position. The control section 3 also drives a motor 7 that forwards a recording sheet 8 at a predetermined speed. The motor 7 actually forwards the sheet by a distance equivalent to the sheet forward speed by rotating at a small angle intermittently every 30 seconds, and causes the travelling stand 5 to make one shuttle corresponding to a recording range in the recording sheet width direction or make a one-way travel or a return travel when the motor 7 stops. During such travel, when the travelling stand 5 passes by the positions corresponding to the segments or dots described with reference to the first to fifth embodiments, printing is done by selecting a color corresponding to each measuring channel to which the measured data belongs. The broken arrow directing from the recording head 6 to the recording sheet 8 indicates ink jetting for printing.

The internal arrangement of the measurement memory 2 in FIG. 6 will now be described with reference to the diagram shown in FIG. 5. In FIG. 5, the leftmost column designates a measurement point number (1), which is classified into a plurality of types, depending on the scale of measurement. The types of measurement point number include: 1 to 6 points, 1 to 12 points, and 1 to 24 points. The column next to the measurement point number is the measured instantaneous value, which comes in two types of values, a current value (2) and a last value (3). The current value (2) means an instantaneous value at a recording start that occurs every 30 seconds. This value is constantly updated by a newly measured instantaneous value every 0.2 second, and it is such newly measured instantaneous value coinciding with a recording start time that is read as a current value. The last value (3) means an instantaneous value at a recording start before the current recording start, i.e., an instantaneous value at a recording start 30 seconds before and is updated every 30 seconds. In other words, a current instantaneous value (2) becomes a last instantaneous value (3) at a next recording start. A maximum value (4) is updated only when the instantaneous value updated every 0.2 second in a period from a last recording start to a current recording start is greater than the last instantaneous value. The maximum value means the greatest value in such period. A minimum value (5) is updated only when the instantaneous value updated every 0.2 second in a period from a last recording start to a current recording start is smaller than the last instantaneous value. The minimum value means the smallest value in such period. As described above, the measurement memory 2 stores data such as the current instantaneous value (2), the last instantaneous value (3), the maximum value (4) and the minimum value (5), each data corresponding to each measurement point number (1).

Therefore, the respective data, the current value (2) and the last value (3), are read at a recording cycle of 30 seconds in the first embodiment; the respective data, the maximum value (4) and the minimum value (5), are read at the same cycle in the second embodiment; the respective data, the current value (2), and a combination of the current value (2) and the last value (3), are read alternately every recording start in the third embodiment (e.g., a current value (2) at a recording start and both a current value (2) and a last value (3) at a next recording start, and a current value (2) at a still next recording start); and the respective data, the current value (2), and a combination of the maximum (4) and the minimum (5), are read alternately every recording start. These read data are subjected to logic operations at the control section 3 (see FIG. 6) so as to position the recording head 6 or to determine the ink jetting time of the travelling recording head 6.

Figure 7:
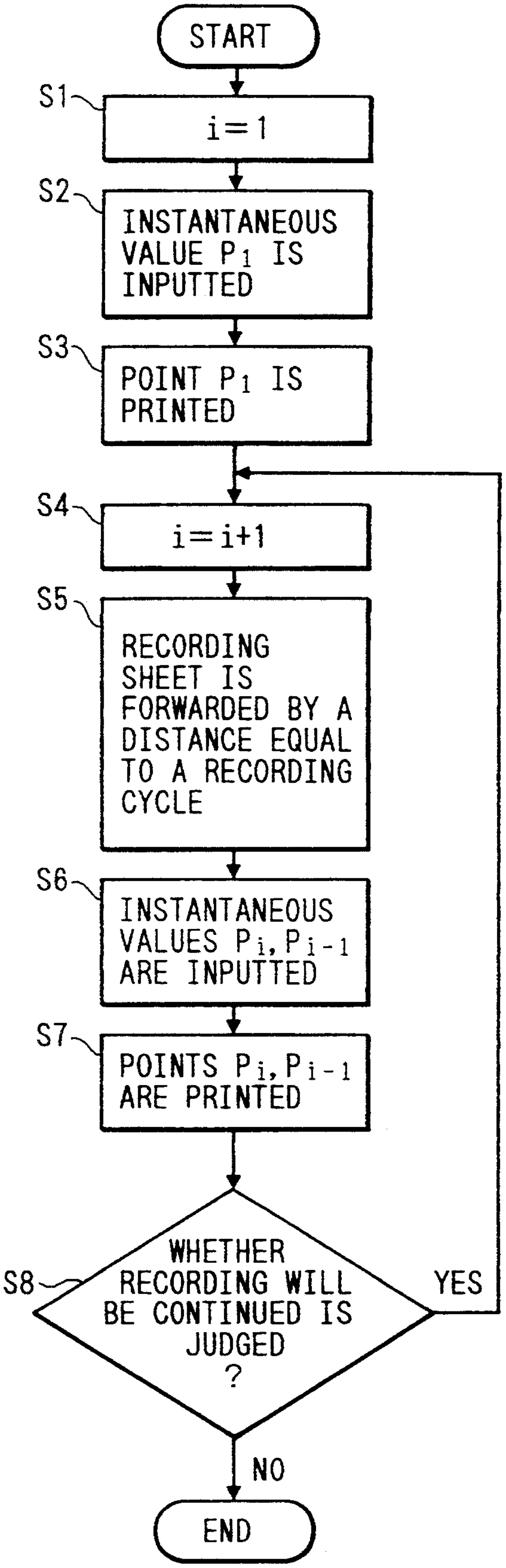
FIG. 7 is a flowchart showing an operation of the first embodiment.

The operation of each embodiment, i.e., the operation of the control section 3 shown in FIG. 6 will be described with reference to the following drawings. FIG. 7 is a flowchart showing the operation of the first embodiment. In Step S1 a recording start sequence number i is initialized. In Step 2 an instantaneous value P1 at a first recording start is inputted, and in Step 3 a point P1 corresponding to the instantaneous value P1 is printed. In Step 4 the recording start sequence number i is incremented, and in Step 5 a recording sheet is forwarded by a distance equal to a recording cycle. For example, the recording sheet is forwarded by about 0.4 mm, which corresponds to a cycle of 30 seconds (at a recording sheet forward speed of 50 mm/hour). In Step S6 instantaneous values Pi, Pi-1 at the recording start i and at a recording start i-1 before the recording start i (data in columns (2) and (3) in FIG. 5) are inputted and a segment Pi·Pi-1 connecting the points corresponding to these instantaneous values is printed in Step S7. In Step S8 whether or not recording will be continued is judged, and if recording is to be continued, the processing is returned to Step S4; otherwise the processing is ended.

Figure 8:
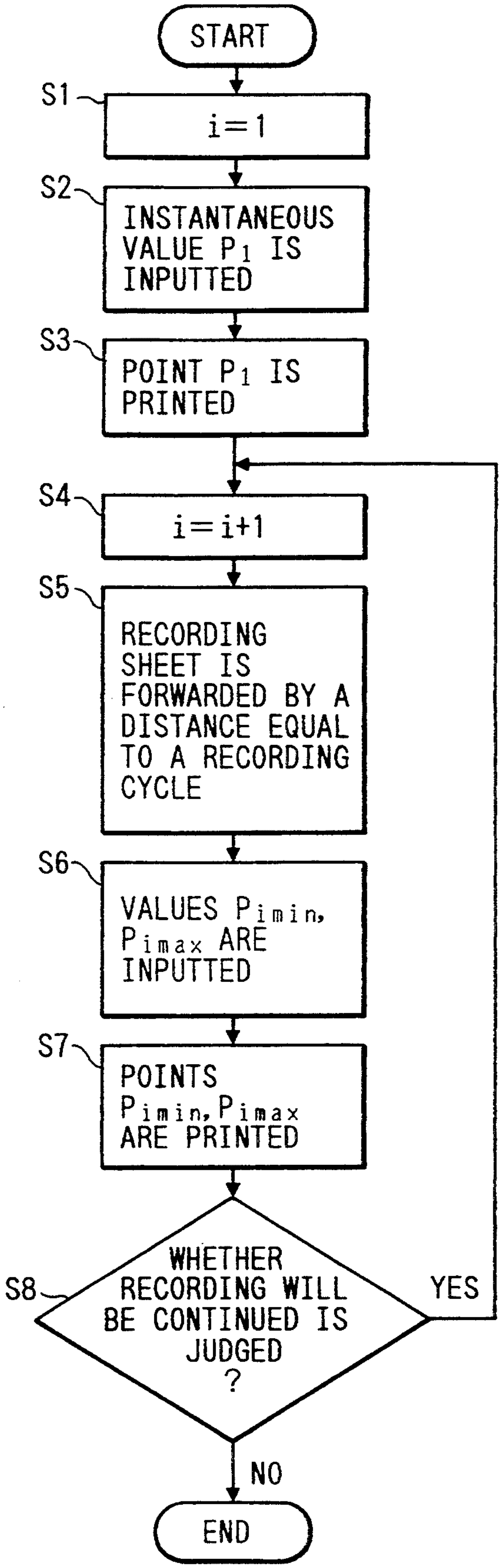
FIG. 8 is a flowchart showing an operation of the second embodiment.

FIG. 8 is a flowchart showing the operation of the second embodiment. The processing from Step S1 to Step S5 is the same as that of the first embodiment. In Step 6 a minimum Pimin ann a maximum Pimax between start time i and start time Pi-1 before start time i (data in columns (4) and (5) in FIG. 5) are inputted and a segment Pimin·Pimax connecting these points is printed. In Step S8 the same processing as Step S8 in the first embodiment will be performed.

Figure 9:
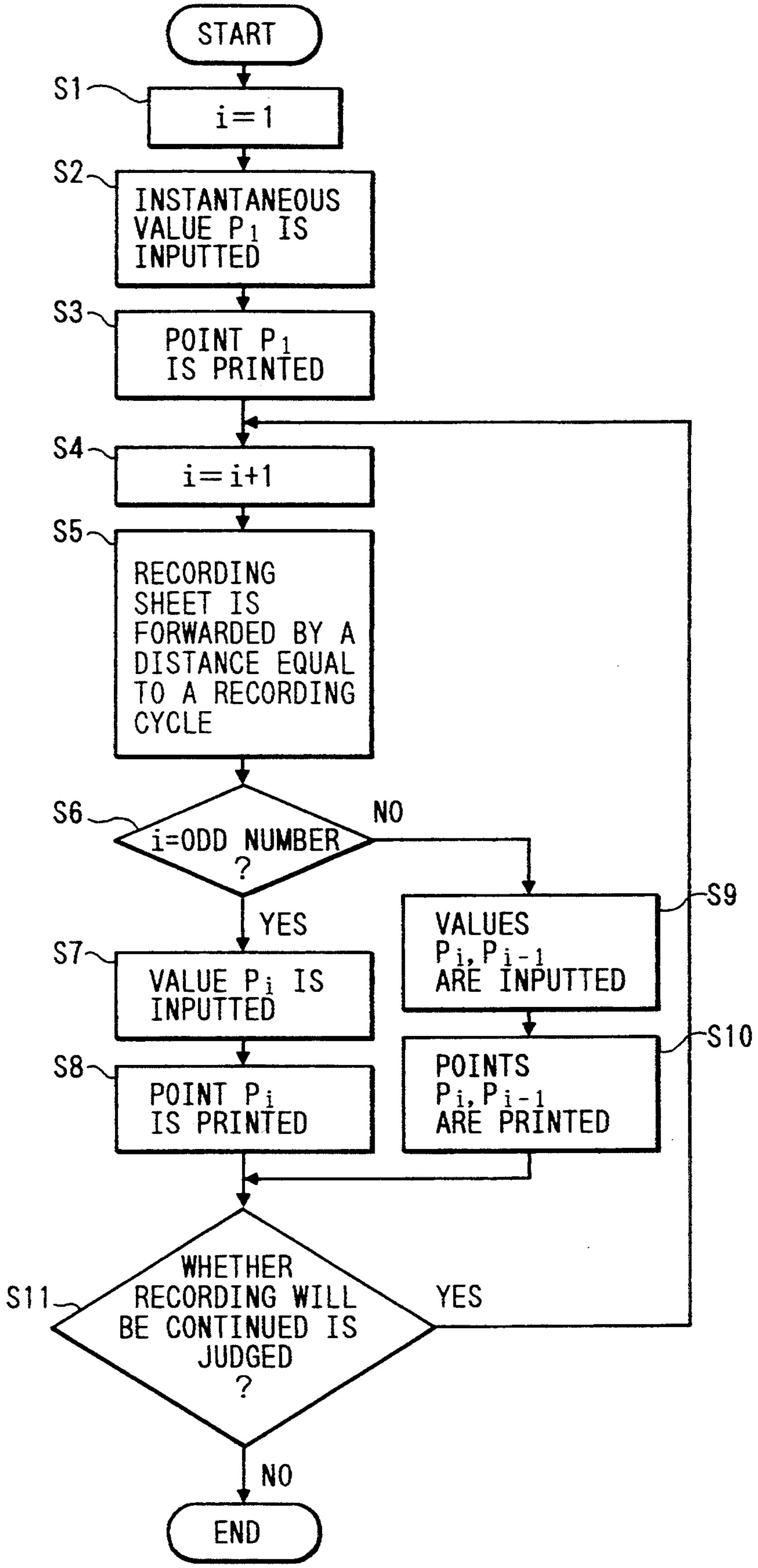
FIG. 9 is a flowchart showing an operation of the third embodiment.

FIG. 9 is a flowchart showing the operation of the third embodiment. The processing from Step S1 to Step S5 is the same as that of the first embodiment. Then, in Step 6 whether or not the recording start sequence number i is odd or even is judged. If i is odd, then value Pi is inputted in Step S7 and point P1 is printed in Step S8. Returning to Step S6, if i is even, then instantaneous values Pi, Pi-1 are inputted in Step S9 and a segment Pi·Pi-1 connecting these points is printed. That is, printing of a point alternates with printing of a segment. In Step S11 the same processing as Step S8 in the first embodiment will be performed.

Figure 10:
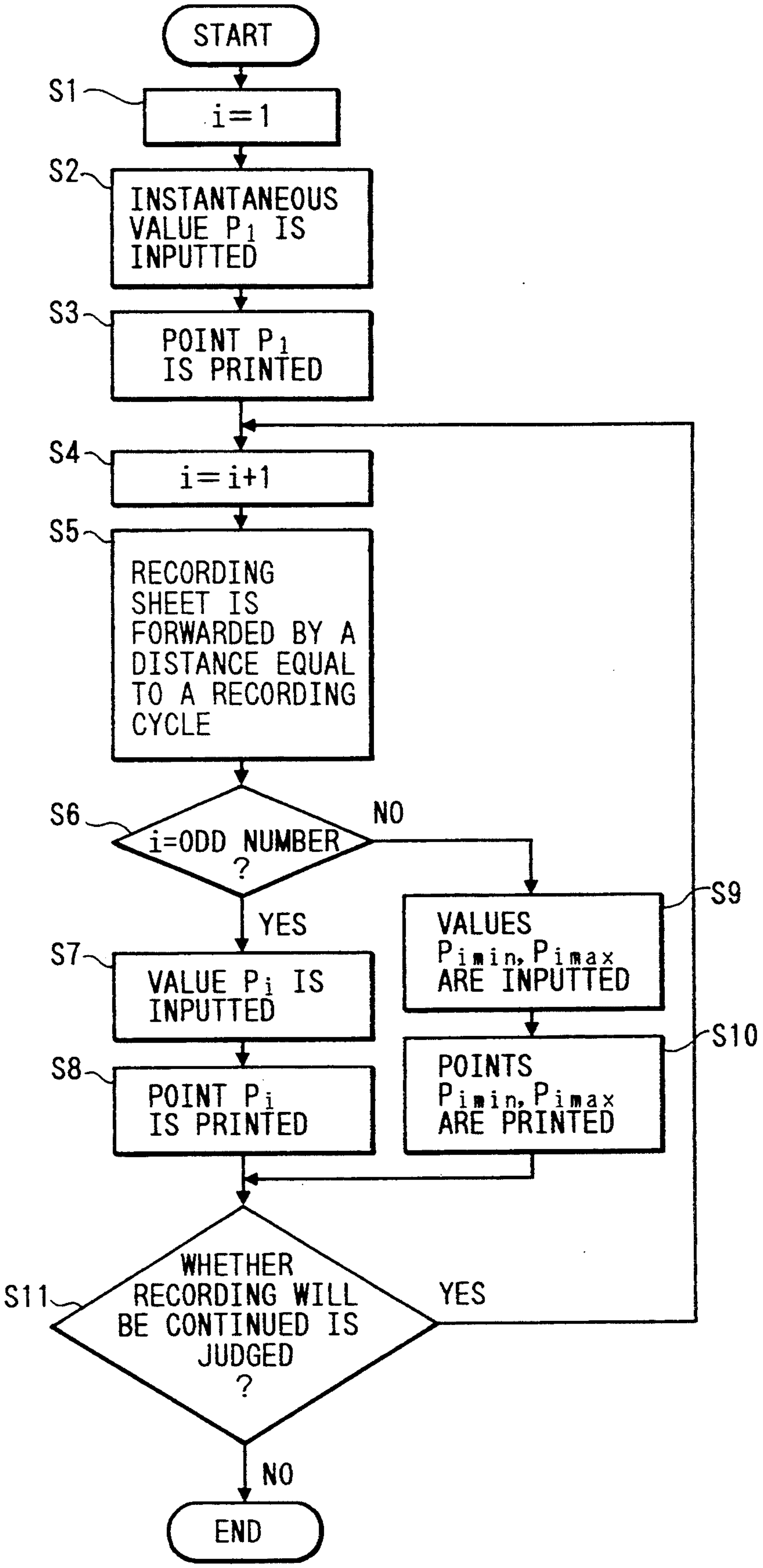
FIG. 10 is a flowchart showing an operation of the fourth embodiment.
Figure 11:
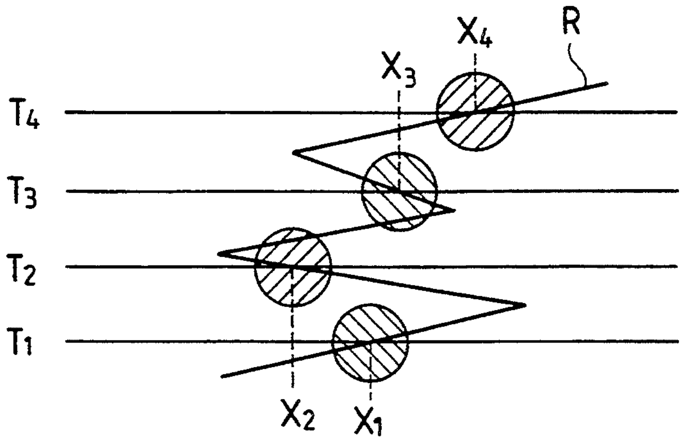
FIG. 11 PRIOR ART
FIG. 11 is a diagram showing a main portion of an exemplary printed line in the conventional example.
Figure 12:
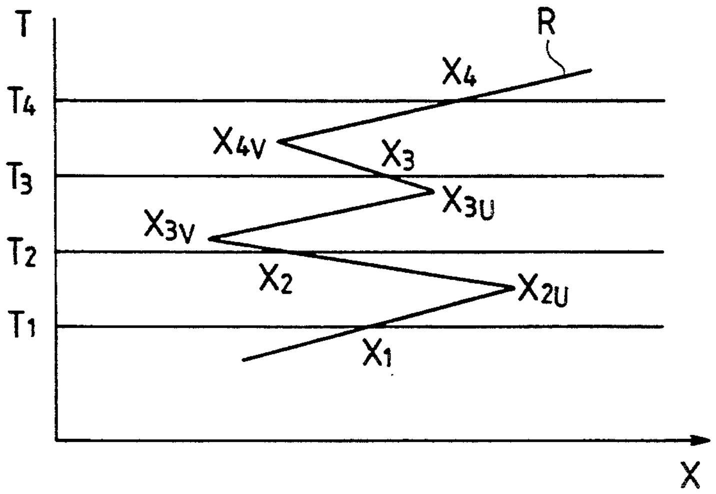
FIG. 12 PRIOR ART
FIG. 12 is a diagram showing a main portion of a fluctuation of actually measured values.

FIG. 10 is a flowchart showing the operation of the fourth embodiment. The processing from Step S1 to Step S8 is the same as that of the first embodiment. In Step 9 a minimum Pimin and a maximum Pimax are inputted and in Step 10 a segment Pimin·Pimax connecting these points is printed. That is, printing of a point alternates with printing of a segment. In Step S11 the same processing as Step S11 in the third embodiment will be performed.

The ink jet recording apparatus according to one of the first to fifth aspects of the invention is designed to cause the control section to make a recording at a time by printing a dot or dots in the form of a segment extending in a recording sheet width direction in such a manner that the segment corresponds to a variation of a measured input between such time and a time before such time. Therefore, a printed line apparently close to a continuously recorded line can be obtained, although the recording is intermittent and thus takes place at a predetermined cycle. As a result, when the invention is applied to recording of the flow rate subject to large fluctuations, a recording faithful to an actual fluctuation can be made, allowing users to make a sure judgment on the actual situation and thus take a correct measure.

The ink jet recording apparatus according to the second aspect of the invention, in particular, makes a recording at a time by printing dots in the form of a segment connecting a position corresponding to a measured input value at such time to a position corresponding to a measured input value at a time before such time. Therefore, a recording faithful to an actual fluctuation can be produced.

The ink jet recording apparatus according to the third aspect of the invention, in particular, makes a recording at a time by printing dots in the form of a segment connecting positions respectively corresponding to a maximum measured input value and a minimum measured input value between such time and a time before such time. Therefore, a recording more faithful to an actual fluctuation than the apparatus according to the third aspect of the invention can be produced.

The ink jet recording apparatus according to the fourth aspect of the invention, in particular, makes not only a recording at every other time on one side by printing dots in the form of a segment connecting a position corresponding to a measured input value at such every other time on one side to a position corresponding to a measured input value at a time before such every other time on one side, but also a recording at every other time on the other side by printing a dot at a position corresponding to a measured input value at such every other time on the other side. Therefore, a recording in which a fluctuation is relatively suppressed or simplified compared with the recording according to the second aspect of the invention can be produced. The recording according to the fourth aspect of the invention thus maintains the feature of the fluctuation almost faithfully and is clear because of a relatively simplified form.

The ink jet recording apparatus according to the fifth aspect of the invention, in particular, makes not only a recording at every other time on one side by printing dots in the form of a segment connecting positions respectively corresponding to a maximum measured input value and a minimum measured input Value between such every other time on one side and a time before such every other time on one side, but also a recording at every other time on the other side by printing a dot at a position corresponding to a measured input value at such every other time on the other side. Therefore, a recording in which a fluctuation is relatively suppressed or simplified compared with the recording according to the third aspect of the invention can be produced. The recording according to the fifth aspect of the invention thus maintains the feature of the fluctuation faithfully and is clear because of a relatively simplified form.

What is claimed is:

1. An ink jet recording apparatus for making a recording on a recording sheet of a measured input at a time occurring at a predetermined cycle, comprising:
   - an ink jet recording head; and
   - a control means for making said recording by said ink jet recording head at said time by printing a plurality of dots, at least a portion of said plurality of dots forming a segment in a recording sheet width direction, said segment having a length corresponding to a variation of said measured input between said time and a previous time before said time.

2. An ink jet recording apparatus according to claim 1, wherein said recording at said time is a printing of a segment connecting a position on said recording sheet having a displacement in said recording sheet width direction corresponding to a measured input value at said time to another position on said recording sheet having a displacement in said recording sheet width direction corresponding to a measured input value at said previous time before said time.

3. An ink jet recording apparatus for making a recording on a recording sheet of a measured input at a time occurring at a predetermined cycle, comprising:
   - an ink jet recording head; and
   - a control means for making said recording by said ink jet recording head at said time by printing a plurality of dots, at least a portion of said plurality of dots forming a segment in a recording sheet width direction, said segment having a length corresponding to a variation of said measured input between said time and a previous time before said time;
   - wherein said recording at said time is a printing of a segment connecting positions on said recording sheet having displacements in said recording sheet width direction respectively corresponding to a maximum measured input value and a minimum measured input value between said time and said previous time before said time.

4. An ink jet recording apparatus for making a recording on a recording sheet of a measured input at a time occurring at a predetermined cycle, comprising:
   - an ink jet recording head; and
   - a control means for making said recording by said ink jet recording head at said time by printing a plurality of dots, at least a portion of said plurality of dots forming a segment in a recording sheet width direction, said segment having a length corresponding to a variation of said measured input between said time and a previous time before said time;

wherein a recording at every other time on one side is a printing of a segment connecting a position on said recording sheet having a displacement in said recording sheet width direction corresponding to a measured input value at said every other time on one side to another position on said recording sheet having a displacement in said recording sheet width direction corresponding to a measured input value at another time before said every other time on one side, and wherein a recording at every other time on an other side is a printing of a dot at a third position on said recording sheet having a displacement in said recording sheet width direction corresponding to a measured input value at said every other time on the other side.

5. An ink jet recording apparatus for making a recording on a recording sheet of a measured input at a time occurring at a predetermined cycle, comprising:

an ink jet recording head; and a control means for making said recording by said ink jet recording head at said time by printing a plurality of dots, at least a portion of said plurality of dots forming a segment in a recording sheet width direction, said segment having a length corresponding to a variation of said measured input between said time and a previous time before said time;

wherein said recording at every other time on one side is a printing of a segment connecting positions on said recording sheet having displacements in said recording sheet width direction respectively corresponding to a maximum measured input value and a minimum measured input value between said every other time on one side and another time before said every other time on one side, and wherein said recording at every other time on an other side is a printing of a dot at another position on said recording sheet having a displacement in said recording sheet width direction corresponding to a measured input value at said every other time on the other side.

6. An ink jet recording apparatus for making a recording on a recording sheet of a measured input at a time occurring in predetermined cycle, comprising:

an ink jet recording head; and a control means for making said recording by said ink jet recording head at said time by printing a single dot at a position on said recording sheet having a displacement in a recording sheet width direction corresponding to said measured input at said time and by printing dots forming a segment in said recording sheet width direction, said segment having a length corresponding to a variation of said measured input between said time and a previous time before said time;

wherein said printing of said single dot alternates with said printing of said dots forming the segment.

7. The ink jet recording apparatus according to claim 6, wherein said segment connects another position on said recording sheet having a displacement in said recording sheet width direction corresponding to said measured input at said time to a third position on said recording sheet having a displacement in a recording sheet width direction corresponding to said measured input at said previous time before said time.

8. The ink jet recording apparatus according to claim 6, wherein said segment connects positions on said recording sheet having displacements in said recording sheet width direction respectively corresponding to a maximum value of said measured input and a minimum value of said measured input between said time and said previous time before said time.

* * * * *